Feb. 20, 1951       F. C. REGGIO       2,542,839
ENGINE REGULATING DEVICE
Original Filed Feb. 5, 1938
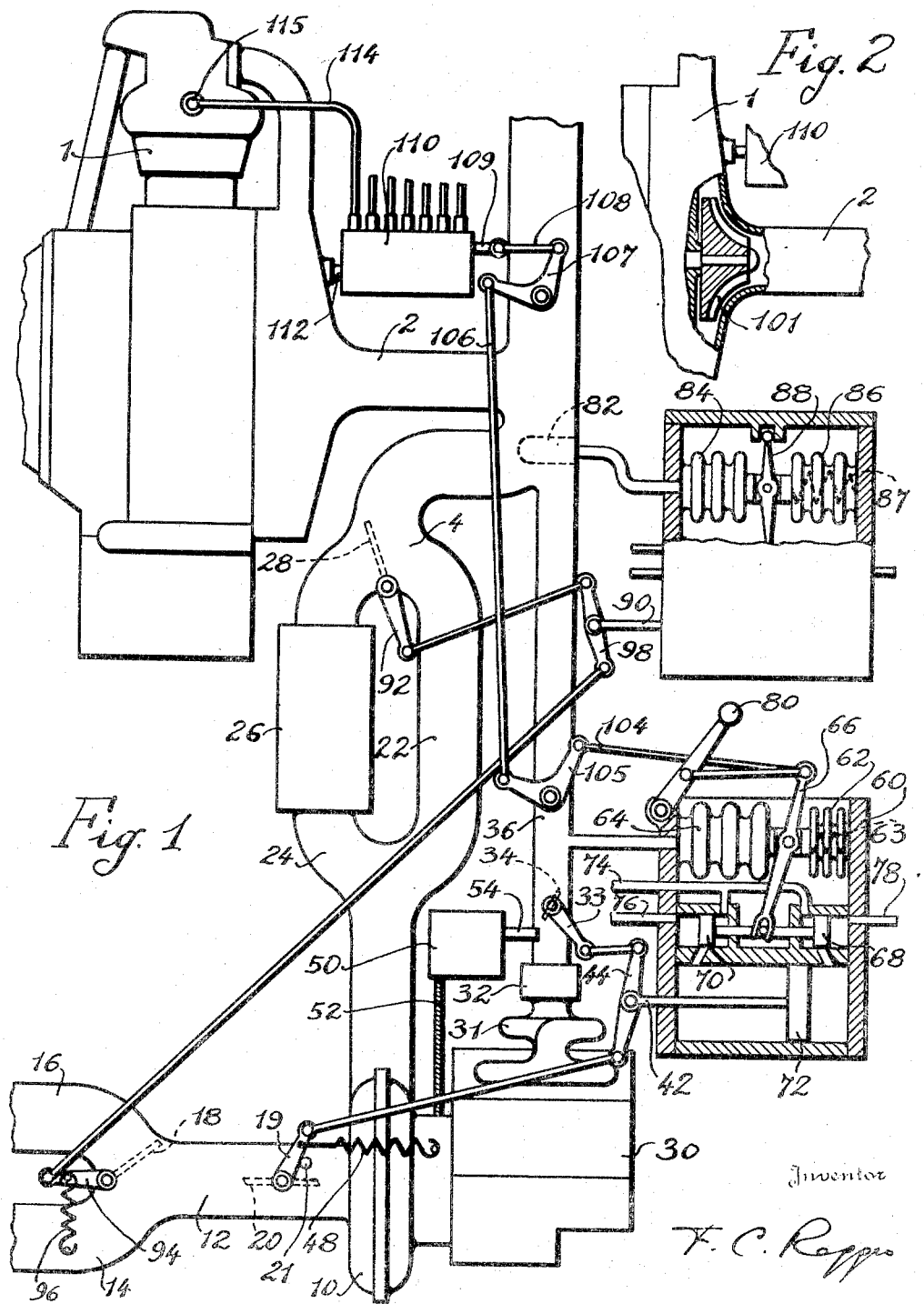

Patented Feb. 20, 1951

2,542,839

UNITED STATES PATENT OFFICE 2,542,839

ENGINE REGULATING DEVICE

Ferdinando Carlo Reggio, Norwalk, Conn.

Original application February 5, 1938, Serial No. 188,960. Divided and this application May 25, 1946, Serial No. 672,319

34 Claims. (Cl. 123—103)

The present application is a division of my copending application Serial No. 188,960, filed February 5, 1938 and now abandoned.

This invention relates to combustion engines, and more particularly to means for controlling the components of the combustible mixture of such engines.

One of the objects of the invention is to provide an improved engine control device which will concomitantly regulate the engine fuel supply and the engine air supply.

Another object is to provide manual means for controlling the engine supply of one of the components of the combustible mixture, together with a servomotor device variably adjustable by said manual means to regulate the engine supply of another component of said mixture automatically.

Another object is to provide manual means directly controlling the engine liquid fuel supply, and an automatic servomotor device variably adjustable from said manual means for regulating the engine air supply.

A further object is to provide a control device for an engine having manually controllable fuel injection system, including power means which will automatically regulate the engine air supply in accordance with the engine fuel supply.

Another object is to provide an improved control device which will efficiently regulate the fuel and air supplies of engines provided with a fuel injection system and a variable speed supercharger.

Another object is to provide an engine control device having control means for variably regulating the engine fuel supply and means which will automatically control the density of the air in the engine induction system in accordance with the engine fuel supply to secure the desired fuel to air ratio.

Another object is to provide a control device for fuel injection engine which will permit direct control of the engine fuel supply per revolution and concomitant automatic regulation of the density of the air supplied to the engine in accordance with the engine fuel supply.

Another object is to provide an engine control device which will automatically vary the fuel to air ratio as a preselected function of the altitude.

A further object is to provide an engine control device which will regulate the liquid charge supplied to the engine by an injection system in predetermined relation to the engine induction air pressure or density.

Other objects and features of the invention will be apparent from the following description taken in connection with the accompanying drawings, in which:

Figure 1 is a somewhat diagrammatic showing of the fuel and air control device as applied to an internal combustion engine.

Figure 2 is a fragmental showing of a modified arrangement of engine air induction system, including a second stage supercharger.

In the following description and in the claims various details will be identified by specific names for convenience, but they are intended to be as generic in the application as the art will permit.

The power output of conventional internal combustion engines is dependent upon the intake manifold pressure. Such pressure, and in turn the engine output, are controlled by means of a throttle valve. It will be appreciated, in particular, that where aviation engines including a large capacity supercharger designed for high altitude operate at low altitude, or at reduced power, or both, a large amount of the power required to drive the supercharger is wasted by throttling, causing a considerable rise in the temperature of the compressed air.

According to the present invention means may be provided for driving the supercharger at an infinite number of speeds, whereby the supercharger delivery can be adjusted to fit each altitude and operating condition within the designed limits.

The invention is shown as applied to a conventional radial aircraft engine 1 having an induction conduit 2 connected through a duct 4 with a blower or compressor 10. Air is supplied to the blower through a conduit 12 having two branches 14 and 16 for leading cold and hot air respectively thereto. A valve 18 is placed at the junction of conduits 14 and 16 and is pivoted so that it may regulate the ratio of cold to hot air admitted to conduit 12 and thereby regulate the resultant temperature of the air in that conduit. A valve 20 is placed in conduit 12 and is adapted to restrict the free area of that conduit and thereby regulate the pressure at the blower intake.

The conduit 4 has two branches 22 and 24. The latter contains an intercooler, shown generally at 26. A valve 28 is placed at the junction of branches 22 and 24 and is pivoted so that it may regulate the proportion of air flowing through the intercooler and thereby control the temperature in conduit 4. The conduit 4 may extend beyond the engine 1 and supply compressed air to other engine or engines, not shown in the drawings.

The blower or compressor 10 is driven by an independent or self-contained motor. Although any type of variable speed motor may be used, its preferred form is disclosed in Fig. 1 as an internal combustion motor 30 having a carburetor 32 to which air is supplied from conduit 4 through a duct 36 in which is placed a throttle valve 34. A conventional supercharger 31, driven by means of gears by the motor 30, is mounted between the carburetor 32 and the cylinders of the motor.

An idling speed governor, indicated generally at 50, prevents the motor 30 from stalling. In the preferred embodiment it consists of a centrifugal type governor, driven from the motor 30 through the flexible shaft 52, and controlling the position of an axially slidable rod 54 which, in turn, limits the clockwise rotation of lever 33 and thereby prevents the throttle valve 34 from restricting the free area of duct 36 below the value corresponding, for each value of the pressure in the duct 36, to the idling speed of motor 30.

The governor 50 is so designed that its energy is substantially greater than the energy of a spring 48, one end of which spring is secured to the lever 19 controlling the valve 20. The spring 48, cooperating with a stop 21, tends to maintain the valve 20 in the open position.

A floating lever 44 is mounted at its median point, by means of a pivot, on an axially slidable rod 42 and its upper and lower ends are connected by means of suitable links with levers 33 and 19 respectively.

In the operation of the above described mechanism the pressure in conduit 4 is controlled by the axial displacement of the rod 42. Assuming said rod 42 to be initially in its extreme right position as shown in Fig. 1, both the valve 20 and the throttle valve 34 will be entirely open, whereby for a given value of the surrounding air density the motor 30 runs at its maximum speed, the air pressure in conduit 4 attains its maximum value and the engine 1 develops its maximum power output.

If now the rod 42 is displaced toward the left, while owing to the action of spring 48 the valve 20 remains in the open position, the throttle valve 34 is caused to rotate so as to restrict the free area of the conduit 36 and thereby reduce the speed of motor 30 and blower 10 and in turn reduce the value of the pressure in conduit 4 and the power output of the engine 1. Continued displacement of the rod 42 in the same direction will cause the speed of motor 30 to be further reduced until the rotation of lever 33 is stopped by the rod 54 operated by the governor 50. The motor 30 will then operate at idling speed, and the pressure in conduit 4 will be practically equal to the surrounding atmospheric pressure. Thereafter, upon continued displacement of the rod 42, the resistance opposed by the governor 50 to further rotation of lever 33 being substantially greater than the resistance opposed by the spring 48 to the rotation of lever 19, while the motor 30 is maintained at idling speed, the floating lever 44 will operate to progressively close the valve 20 and thereby reduce the pressure in conduit 4 to such a low value as may be required for idling speed of the engine 1. Obviously, when the rod 42 is displaced in the opposite direction back to its initial position, first the valve 20 will be open while the motor 30 is idling, and thereafter the speed of the motor 30 will be increased to its maximum value corresponding again to the maximum power output of the engine 1.

It is to be noted in the foregoing that the blower 10 has been assumed to be of the centrifugal type. Although the above mentioned type is particularly advantageous in the present system, it is to be understood that the invention is not limited thereto but that various other well-known types of blower may be employed. If a blower of the positive-displacement type is used, the pressure in the conduit 4 corresponding to idling speed of the engine 1 is obviously obtained for a value of the speed of motor 30 above the idling speed of said motor, the blower inlet being unrestricted, whereby the valve 20 and the floating lever 44 become unnecessary and the rod 42 may be linked directly to the lever 33.

It may be further noted that the engine 1 may include an additional blower 101, as shown in Figure 2, driven by means of gears from the engine 1 and inserted between the first stage supercharger 10 and the engine cylinders. Said blower 101 may be of the well-known type of superchargers which are employed primarily in radial engines to improve the mixture distribution to the cylinders, and which are characterized by their relatively low peripheral speed.

A pressure regulator, indicated generally at 60, is provided to operate the rod 42. The pressure regulator may be any device capable of displacing the rod 42 in response to a change in the pressure inside the duct 36. In the embodiment shown this regulator includes a metallic bellows 62 sealed under vacuum and provided with a spring 63 adapted to expand said bellows. This bellows acts directly against a similar bellows 64 connected with the duct 36. These two bellows act on a lever 66 to operate pistons 68 and 70 which control the admission of a compressed fluid to opposite sides of piston 72 which in turn operates the rod 42. The compressed fluid, usually oil from an engine-driven pump, is led into the pipe 74 and returns to the engine crankcase through conduits 76 and 78. The surrounding atmospheric pressure acts on the two bellows in opposite directions so that any change of pressure in the duct 36 operates the bellows 64 and in turn the piston 72 and returns the pressure in duct 36 to the predetermined value, independently of any variation in atmospheric pressure such as that due to the altitude.

A manual control 80, adjustable while in flight by the pilot and connected with the upper point of lever 66, is provided, whereby the value of the pressure automatically maintained in duct 36 by the regulator 60 may be controlled. This value of the pressure in ducts 36 and 4 is dependent upon the load of spring 63 mounted within bellows 62, which load is in turn dependent upon the position of control lever 80. In fact, if we assume that the engine 1 operates under steady conditions with lever 80 adjusted in a certain angular position, there corresponds in conduit 4 and within bellows 64 a definite pressure that balances the resilient load of spring 63 plus the eventual resilient loads of bellows 62 and 64 and the pressure within bellows 62 if the latter is not completely evacuated; the pilot valve 68, 70 is in neutral position, and the piston 72 of the servo-motor is stationary. If now the pressure in conduit 4 and within bellows 64 decreases, owing for example to increased altitude, bellows 64 contracts, moving the pilot valve 68, 70 toward the left, and causing piston 72 to be displaced toward the right to actuate either throttle valve 34, or throttle valve 20, in a direction to increase the air pressure in conduit 4. Movement of the piston 72 of the servomotor will continue until the pressure in duct 4 and within bellows 64 resumes the initial value corresponding to, or determined by, the position in which control lever 80 is adjusted. Obviously, an increase of pressure in duct 4 will set the servo-motor in motion in opposite direction until the pressure therein resumes the initial value determined by the position of control lever 80.

Conversely, when the pilot desires to vary the pressure in conduit 4, for example to increase this pressure, he rotates lever 80 clockwise to a new angular position. This will cause at first clockwise rotation of lever 66 about its middle point and displacement of pilot valve 68, 70 to the left, actuating the servo-motor in a direction to increase the pressure in said conduit and within bellows 64. The latter will then gradually expand, compressing spring 63, rotating lever 66 anticlockwise about its upper end, and displacing pilot valve 68, 70 to the right. Operation of the servo-motor in a direction to increase the supercharging pressure will continue until the pilot valve 68, 70 resumes its neutral position, with the pressure within bellows 64 at a higher value, balancing the increased load of spring 63. In similar manner anticlockwise rotation of control lever 80 to a new angular position will cause the air pressure in conduit 4 to be reduced to and maintained at a correspondingly lower value.

It is therefore apparent that for each given position of control means 80 there will correspond a definite constant value of the pressure in duct 4, that is to say, the value of the pressure in said duct is determined by the position of the control means 80. This, obviously, is true within certain limits of altitude, as beyond these limits the supercharging pressure controls become at least in part inoperative.

It is to be noted that, for a given position of the manual control 80, the absolute pressure in duct 36 and in conduit 4 will have a constant value within the designed altitude. The power output of engine 1 will increase with the altitude, owing to the corresponding decrease in the exhaust counter-pressure. Instead of a constant absolute pressure in conduit 4, a substantially constant power output of engine 1 at a given speed of the latter may however be obtained with a bellows 62 of smaller displacement than the bellows 64. For instance, where bellows 62 and 64 have different diameters, the pressure regulator is responsive not only to the absolute pressure in the conduit 4, but also to the surrounding atmospheric pressure, and automatically maintains in conduit 4 an absolute pressure which varies proportionally to changes of the surrounding atmospheric pressure, the ratio of proportionality depending on the ratio of the diameters of said bellows. In particular, with a bellows 62 having a smaller diameter than bellows 64, a reduction of the surrounding atmospheric pressure determines a corresponding reduction of the absolute pressure in conduit 4, and it is clear that it will be possible to establish the relative dimensions of bellows 62 and 64 in such way that a drop in the surrounding pressure, due for example to an increase of altitude, causes a corresponding reduction of supercharging pressure which substantially compensates the effect on the engine power output of the drop of exhaust counterpressure, thus maintaining the power output of the engine, at a given speed thereof, constant or substantially constant independently of changes of altitude. Therefore, with bellows 64 and 62 of unequal displacements or unequal effective diameters, the pressure in conduit 4 will be dependent upon both the angular position of control lever 80 and the altitude, that is to say, will be regulated as a preselected function of the surrounding atmospheric pressure and the position of said control means.

Figure 1, considered in combination with Figure 2, illustrates a powerplant arrangement in which air is supplied to the engine 1 by two supercharges 10 and 101 in series, with an intercooler 26 which, as shown in the drawings, is interposed between superchargers; this arrangement being particularly suitable in connection with aircraft powerplants designed for operation at high altitude. When this powerplant is operating under cruising power at moderate or low altitudes, the blower 10 may become unnecessary, in which case the pressure regulator 60, together with the spring 48, will cause the motor 30 to operate at idling speed, with the blower 10 rotating at such low speed as to be substantially ineffective and negligible. Under these conditions the pressure regulator 60 actuates the throttle valve 20 exclusively, angularly adjusting the latter to automatically regulate the air pressure in conduit 4 at a value dependent upon the adjustment of control lever 80 and, where bellows 62 and 64 have unequal diameters, also dependent upon the pressure surrounding these bellows. Obviously, where steady cruising operation at moderate or low altitudes is expected, the motor 30, instead of being kept idling, may be stopped. Furthermore, where operation at high altitude is not contemplated, both the motor 30 and the blower 10 may be removed or eliminated from the powerplant, in which case the upper end of lever 44 may be disconnected from lever 33 and connected with a fixed pivot, the pressure regulator 60 thus being operatively connected to operate on the throttle valve 20 exclusively.

In order to automatically maintain the air temperature in conduit 4 at a predetermined value, a temperature regulator is provided, including a temperature responsive element, 82 connected with a bellows 84 acting directly against a similar bellows 86. Bellows 86 is sealed under vacuum and is provided with a spring 87 adapted to expand it against the surrounding pressure. These two bellows act on a lever 88 to operate a servo mechanism similar to that described for the pressure regulator and which it is considered unnecessary again to describe in detail. Temperature changes in conduit 4 will cause a displacement of rod 90 which in turn operates a floating lever 98 whose upper and lower ends control, by means of levers 92 and 94, the valves 28 and 18 respectively. A spring 96 tends to maintain the valve 18 in the position in which cold air only is admitted to the intake of blower 10.

Assuming the temperature of the air at the blower outlet to be equal to the predetermined temperature to be maintained in conduit 4, the valve 28 will be maintained by the regulator in the position shown in Figure 1, in which position no amount of air flows through the intercooler 26. A decrease in the temperature about the element 82 will cause a displacement toward the right of rod 90 and thereby operate the valve 18 to reduce the proportion of cold air and increase the proportion of hot air admitted to the blower intake. Conversely, an increase in the temperature about the element 82 will cause rotation of valve 18 in the opposite direction and thereby reduce the temperature at the blower intake, until valve 18 reaches its extreme position corresponding to admission of cold air only. Thereafter, further increase in the temperature will cause the valve 28 to be rotated so as to admit the necessary amount of air to the intercooler. Obviously, the temperature regulator, if provided with bellows 84 and 86 of equal displacements, is unaffected by changes in atmospheric pressure.

In the aforementioned parent application, the foregoing control device is disclosed in connection with a carburetor engine. However, the foregoing control device may also find other uses, such as the delivery and regulation of the air supply of engines known as injection, or Diesel, or compression-ignition engines. The upper end of lever 66 may either be kept in a fixed position, in which case the compressed air in conduit 4 will be maintained at a constant density within the designed range of altitude, or it may be connected with the means for controlling the supply of combustible fuel to the engine, in such a way that upon an increase or decrease in the engine fuel supply there will correspond an increase or decrease in the density of the air supplied to said engine, respectively. Where bellows 62 and 64 of equal displacement are provided, said air density is otherwise independent of the surrounding atmospheric conditions.

The engine 1 shown in the drawings is an injection engine, that is to say, is provided with a fuel injection pump, represented as a pump 110 of conventional design which, as usual, is driven from the engine by means of a shaft, such as indicated by numeral 112. From the pump 110 fuel is led to the cylinders of engine 1 through pipes 114 and nozzle valves 115, this being a known arrangement.

The injection pump 110 is provided with conventional means 109 for controlling the supply of fuel to the engine. Such fuel control means 109 is connected with the upper end of the floating lever 66 of the pressure regulator 60 by means of a linkage including bellcrank levers 105 and 107 and rods 104, 106 and 108. The injection pump 110 is so arranged that movements of the fuel control member 109 to the right or to the left, as shown in Fig. 1, respectively increase or decrease the engine fuel supply.

It will be noted, therefore, that clockwise rotation of the control lever 80 determines an increase of engine fuel supply and an increase of engine induction air density and engine air charge, while counter-clockwise rotation of control lever 80 causes a decrease both in the engine fuel supply and in the engine air charge, the device thus maintaining a suitable fuel-air ratio under all engine loads.

It will be further noted that where bellows 62 and 64 have same displacement, and are therefore unaffected by variations of atmospheric pressure, for any given adjustment of the control lever 80 the engine air charge and in turn the fuel-air ratio are not affected by variations of operative temperatures or changes of altitude within the designed limits of the latter.

However, if bellows 62 and 64 of unequal displacements are provided, which are responsive as a unit to the surrounding atmospheric pressure, the engine air charge, and in turn the fuel-air ratio, are automatically caused to vary with changes of altitude. For instance, where a bellows 62 of smaller displacement than bellows 64 is provided, as stated above, the density of the induction air in conduit 2 decreases as the altitude increases, causing the fuel-air ratio to increase as the altitude increases. The opposite result, that is to say a fuel-air ratio which decreases as the altitude increases is evidently obtained with a bellows 62 having larger displacement than bellows 64. In each case the rate of fuel-air ratio variation for a given altitude change is dependent upon the relative sizes of the two bellows.

The foregoing embodiments of the invention have been shown merely for purpose of illustration and not as a limitation of the scope of the invention. It is therefore to be expressly understood that the invention is not limited to the specific system shown, but may be used in various other ways, in connection with an injection system 110 adapted to supply to the engine any suitable liquid, or with other suitable mechanisms and regulators, and various modifications may be made to suit different requirements; and that other changes, modifications, substitutions, additions and omissions may be made in the construction, arrangement and manner of operation of the parts without departing from the limits or scope of the invention as defined in the following claims.

In interpreting these claims, where they are directed to less than all of the elements of the complete system disclosed, they are to be construed as covering possible uses of the recited elements in installations which may lack the non-recited elements.

What I claim is:

1. For an engine having a fuel injection system including fuel supply control means, manually operated means actuating said fuel supply control means directly whereby the engine fuel supply per cycle is independent of the engine induction air pressure, engine air supply control means, servomotor means operating on said air supply control means, adjustable means responsive to the surrounding atmospheric pressure and to the engine induction air pressure to control said servomotor means, and a connection between said manually operated means and said pressure responsive means to vary the operative setting of the latter as the liquid fuel supply is changed.

2. For an engine having a fuel injection system including fuel supply control means, manually operated means to adjust said fuel supply control means directly whereby the engine fuel supply is independent of the engine induction air pressure, engine air supply control means, adjustable means subject and responsive to the atmospheric pressure and to the engine induction air pressure to control said air supply control means, and a connection between said manually operated means and said pressure responsive means to vary the operative setting of the latter as the adjustment of said fuel supply control means is changed.

3. In combination, engine liquid fuel supply control means, manual control means connected therewith, first and second valve means controlling the engine air supply, adjustable operative condition responsive means actuating said first and second valve means in sequence, and a connection between said manual control means and said condition responsive means to alter the operative adjustment of the latter means upon changes in the setting of said manual control means.

4. For use with an engine having a liquid fuel supply system, and a variable speed supercharger, a control device including fuel control means for said system, speed control means for said supercharger, and common manual means to actuate both said fuel control means and speed control means.

5. For an engine having a throttle valve and a fuel injection system having fuel control means, an engine induction air pressure regulator including reversible motor means operating on said valve, adjustable means responsive to the atmospheric pressure and to the engine induction air pressure to control said motor means; and common manual control means adjustable during operation and connected directly with said fuel control means and through said pressure responsive means and motor means with said throttle valve, whereby the engine fuel supply per cycle varies with the adjustment of said manual control means, while the engine induction air pressure varies as a predetermined function of the atmospheric pressure and of the adjustment of said manual control means.

6. In combination, engine fuel supply control means, engine induction air temperature regulating means, a regulator controlling the pressure of the engine induction air, pressure responsive means actuating said regulator, adjusting means for said pressure responsive means to alter the value of the induction air pressure and in turn the valve of the induction air density maintained by said regulator, and a manual control operating on said adjusting means and on said fuel supply control means.

7. In combination with an engine, a fuel injection system therefor having fuel control means, engine manifold air pressure regulating means, two coaxial unbalanced bellows responsive to atmospheric pressure and manifold air pressure to control said pressure regulating means, adjusting means altering the operative setting of said bellows to vary the manifold air pressure maintained by said regulating means, and common control means actuatable during operation to adjust said fuel control means and said adjusting means simultaneously.

8. In combination, engine liquid fuel supply control means, engine manifold air temperature regulating means, variably adjustable pressure regulating means including reversible motor means controlling the manifold air pressure and in turn the manifold air density, and common control means connected with said fuel supply control means and with said pressure regulating means to vary the adjustment of both means simultaneously during operation.

9. In combination with an engine, a fuel supply system therefor having fuel delivery control means, a variable speed supercharger, supercharger speed control means, a throttle valve, an engine induction air temperature regular, temperature responsive means controlling said regulator, an engine induction air pressure regulator including reversible motor means actuating said speed control means and valve in sequence, adjusting means for said pressure regular altering the value of the induction air pressure and in turn the value of the induction air density maintained by said pressure regulator, and common control means operatively connected with both said fuel control means and adjusting means to alter the engine fuel and air supplies during operation.

10. In an engine control, engine fuel supply control means, engine air supply control means, a manually operable control member connected to and actuating the former control means directly and the second control means indirectly through servomotor means, and pressure responsive means subject to the surrounding atmospheric pressure and actuating said air supply control means through said servomotor means with variations of said surrounding atmospheric pressure, whereby the fuel to air ratio varies as a preselected function of the altitude and changes temporarily upon motion of said manually operable control member.

11. In an engine control, engine fuel supply control means, engine air supply control means including manifold temperature and manifold air pressure regulating means, a manually operable control member connected with and actuating said fuel supply control means and manifold air pressure regulating means, and atmospheric pressure responsive means also actuating said manifold air pressure regulating means to regulate the fuel to air ratio in predetermined relation to altitude.

12. For use with a supercharged engine, control means adjustable during operation; engine fuel supply regulating means operated from said control means; and engine air supply regulating means; said air supply regulating means including engine induction air temperature regulating means, and engine induction air pressure regulating means variably adjusted from said control means.

13. For an internal combustion enging having a fuel supply system, fuel control means therefor, a throttle valve, a supercharger, and supercharger control means for varying the effective compression ratio thereof: a control device comprising an operative connection between the fuel control means, the throttle valve and the supercharger control means; said connection being so constructed and arranged that as the fuel control means moves from minimum to maximum engine fuel supply, the throttle valve and the supercharger control means are operated in sequence so as to first open the throttle valve and thereafter, with the valve in substantially open position, to increase the effective compression ratio of the supercharger.

14. For an engine having a fuel supply system and fuel control means therefor, a throttle valve, a controllable supercharger and supercharger control means therefor to vary the effective pressure ratio thereof; a control device including: an engine control member; a first operative connection for moving the fuel control means from the engine control member to increase the fuel flow as the control member is moved to increase engine power; and a second operative connection for actuating the throttle valve and the supercharger control means in sequence from the same control member to first open the throttle valve and thereafter increase the effective pressure ratio of the supercharger as the engine control member is moved to increase engine power.

15. In an engine having a fuel injection pump, fuel control means therefor, a throttle valve, a variable speed supercharger, and supercharger speed control means: a connecting device transmitting motion of the fuel control means sequentially to the throttle valve and supercharger speed control means; said device operating first to open the throttle valve and thereafter to increase the supercharger speed upon motion of the fuel control means in a direction to increase the engine fuel flow.

16. In a control for an engine having a fuel supply system and fuel control means therefor, a throttle valve, a variable speed supercharger, and supercharger speed control means: servomotor means so constructed and arranged as to operate sequentially on the throttle valve and supercharger speed control means; engine induction pressure responsive means actuating the servomotor means; pressure regulating means connected with the pressure responsive means to vary the operative setting thereof; and an operative connection between the fuel control means and the pressure regulating means.

17. In a control for an engine having a fuel supply system and fuel control means therefor, a throttle valve, a supercharger having controllable effective pressure ratio, and supercharger control means: a control member for variably regulating the engine output; servomotor means operating on the throttle valve and supercharger control means in sequence; engine induction pressure and atmospheric pressure responsive means actuating the servomotor means; pressure regulating means for varying the operative setting of the pressure responsive means; a first operative connection between the control-member and the fuel control means; and a second operative connection between the same member and the pressure regulating means.

18. In a control for an engine having liquid fuel control means, a throttle valve, a variable speed supercharger, and supercharger speed control means: an induction temperature regulating system including an air cooler and a temperature responsive element connected with the engine induction system and controlling said cooler; servomotor means operating on the throttle valve and supercharger speed control means in sequence; induction pressure responsive means actuating the servomotor means; pressure regulating means for varying the operative setting of the pressure responsive means; and an operative connection between the fuel control means and the pressure regulating means to vary the induction air density in preselected relation to the engine supply of liquid fuel.

19. For use with an engine having a throttle valve and an injection pump provided with fuel control means: a control device including a control member actuated by the operator, pilot or driver to variably regulate the engine output; a connection between the fuel control means and the control member for actuating the former from the latter without interposition of any servomotor therebetween; and an operative connection including reversible servomotor means between the same control member and the throttle valve for transmitting the motions of the former to the latter through said servomotor means and with the time lag inherent in the operation of the servomotor means, whereby actuation of the control member in a direction to accelerate the engine results in a temporary increase of the engine fuel-air ratio.

20. For use with an air-consuming combustion engine having a variable restriction whereby the engine air supply may be altered, first control means for modifying said restriction to vary said air supply, a liquid fuel injection pump, and second control means for variably regulating the quantity of fuel supplied to the engine: a control device including a control member actuated by the operator to variably select engine operation; a connection between the control member and said second control means for transmitting motion from the former to the latter without interposition of any servomotor therebetween; and an operative connection including reversible servomotor means between the same control member and said first control means for transmitting motion of the former to the latter through said servomotor means and with the time lag inherent in the operation of said servomotor means.

21. For use with an air-consuming combustion engine having a variable restriction whereby the engine air supply may be altered, first control means for modifying said restriction to vary said air supply, a fuel pump, and second control means for variably regulating the quantity of fuel supplied by the pump to the engine: a manual control member; a connection for actuating the second control means from the control member; servomotor means operating on said first control means; surrounding atmospheric pressure and engine induction air pressure responsive means to actuate the servomotor means; adjusting means connected with the pressure responsive means to alter the operative setting thereof; and an operative connection between the manual control member and the adjusting means.

22. In a control device for a supercharged aircraft engine having a throttle valve, an injection pump to supply a liquid to the engine, and delivery control means to vary the quantity of liquid delivered by the pump to the engine: a control member; a connection between the control member and the delivery control means to transmit the movements of the former to the latter; servomotor means operating on the throttle valve; surrounding atmospheric pressure and induction pressure responsive means actuating the servomotor means; adjusting means for said pressure responsive means to vary the operative setting thereof; and a connection between the control member and the adjusting means.

23. For use with a combustion engine having a liquid fuel supply system, a combustion air passage, and an air compressor in said passage, a coordinating control device including: fuel flow control means for said fuel system; second means operating to control the speed of the compressor; a common manually actuated control member operating on the settings of both said fuel flow control means and second means; and a stand-by governor driven at speed equal or proportional to the compressor speed and becoming effective to control said speed at predetermined value thereof.

24. For use with an engine having a liquid fuel supply system, and a variable speed supercharger, a control device including: fuel control means for the fuel system; speed control means for the supercharger; a common manually actuated control member operating on both said speed control means and fuel control means; and pressure responsive means also operating on said speed control means.

25. For an engine having a fuel supply system and a variable speed supercharger, a control device including: fuel control means for the fuel system; speed control means for the supercharger; a manually actuated control member operating on both said speed control means and fuel control means; and means responsive to engine induction pressure and to a pressure tending to vary with changes of altitude also operating on said speed control means.

26. For an air-consuming combustion engine having a fuel supply system, an air compressor and an additional combustion engine to drive the compressor at variable speed, a control device including: fuel control means for the fuel system; speed control means for the additional combustion engine; and a manually actuated control member operating on both said fuel control means and speed control means.

27. For use with an engine having at least one combustion chamber, passage means leading air to the combustion chamber and discharging combustion products therefrom, a liquid fuel supply system, an air compressor in said passage means, and a variable-area restriction in said passage means to vary engine operation, a control device including: fuel control means for said fuel system; means for controlling the speed of said compressor; common manually actuated control means operating on both said fuel control means and compressor speed control means; and an operative connection actuating said compressor speed control means and said variable area restriction in predetermined sequence.

28. In combination with an aircraft engine: a fuel injection system replacing the carburetor and thereby eliminating the need for the geared engine-driven compressor which insured uniform fuel distribution to the engine cylinders; a supercharger mounted separately from the engine and having sufficient capacity to supply full engine manifold air pressure up to the designed altitude ceiling without requiring any engine-driven compressor; an auxiliary power unit driving said supercharger at progressively variable speed; conduit means connecting the discharge side of said supercharger to the engine cylinders; an air cooler in said conduit means to lower the temperature of engine intake air, said air cooler being inserted downstream of said supercharger whereby the air leaving the cooler is led to the engine cylinders without being subjected to any further heat of compression; first control means to vary the fuel delivery of said injection system; second control means to vary the speed of said supercharger; and common manually actuated means operating on both said first and second control means.

29. For use with an engine having a fuel injection system, first regulating means in said injection system to vary the fuel delivery thereof, an induction system, a supercharger connected with said induction system, means for driving the supercharger at progressively variable speed, and second regulating means to vary the supercharger speed, a control device including a manually operated control member; a first operative connection actuating the first regulating means from the manual control member; and a second operative connection including pressure responsive means connected with said induction system downstream with respect to said supercharger and whose operation is dependent upon the setting of said manual control member to actuate the second regulating means.

30. For use with an engine having a fuel injection system, first control means varying the fuel delivery of said injection system, an induction system, a supercharger connected with said system, means for driving the supercharger at variable speed, second control means to vary the speed of the supercharger, and a manual control member, control apparatus including: a first operative connection between the manual control member and the first control means actuating the latter in predetermined relation to changes in the setting of the manual control member; and a second operative connection including pressure responsive means, conduit means connecting the pressure responsive means with said induction system, and servomotor means under the control of the pressure responsive means and actuating the second control means as a result of changes in the setting of the manual control member.

31. For use with an engine having an injection system, injection control means, a throttle valve, and a variable speed supercharger; a regulator including pressure sensitive means for actuating the throttle valve and varying the supercharger speed, means for changing the datum of said regulator, and common manually operated means for actuating said injection control means and said datum changing means.

32. For use with an engine having an injection system, injection control means, an induction system, and a throttle valve and a variable speed supercharger connected with the induction system; an induction pressure regulator including pressure sensitive means for actuating said throttle valve and varying the supercharger speed; means for changing the datum of said regulator; a manually actuated member; a first operative connection between said member and said injection control means; and a second operative connection between said member and said datum changing means.

33. For use with an engine having an injection system to supply a liquid charge to the engine, injection control means to vary said charge, a supercharger, and means for driving the supercharger at variable speed: a regulator including servomotor means under the control of pressure sensitive means for variably regulating the supercharger speed; means for changing the datum of said regulator; and common manualy operated means for actuating said injection control means and said datum changing means.

34. For use with an engine having an air induction system, a supercharger, means for driving the supercharger at variable speed, supercharger speed regulating means, a throttle valve, an injection system, and injection control means for the injection system: a regulator through which the setting of the throttle valve and the speed of the supercharger may be automatically regulated to control the induction pressure; means for changing the datum of said regulator; servomotor means in said regulator controlling the throttle valve; servomotor control means; a pressure sensitive device actuating said servomotor control means upon changes of induction pressure; manually actuated means for operating said datum changing means; and an operative connection between said manually actuated means and said injection control means.

FERDINANDO CARLO REGGIO.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,217,364 | Halford et al. | Oct. 8, 1940 |
| 2,383,563 | Pugh et al. | Aug. 28, 1945 |
| 2,383,979 | Lysholm | Sept. 4, 1945 |
| 2,419,171 | Simpson et al. | Apr. 15, 1947 |